Oct. 27, 1964     B. R. F. KENDALL     3,154,747
APPARATUS AND METHOD FOR IMPROVING THE RESOLVING
POWER OF ANALYTICAL INSTRUMENTS
Filed April 16, 1962     7 Sheets—Sheet 1

Inventor

Bruce R. F. Kendall

Inventor
Bruce R. F. Kendall
By Stevens, Davis, Miller & Mosher
Attorneys

United States Patent Office 3,154,747
Patented Oct. 27, 1964

3,154,747
APPARATUS AND METHOD FOR IMPROVING THE RESOLVING POWER OF ANALYTICAL INSTRUMENTS
Bruce R. F. Kendall, State College, Pa., assignor to National Research Council, Ottawa, Ontario, Canada, a corporation of Canada
Filed Apr. 16, 1962, Ser. No. 187,567
Claims priority, application Canada Apr. 25, 1961
14 Claims. (Cl. 328—165)

This invention relates to apparatus and method for increasing the resolving power of analytical instruments, and is particularly concerned with such apparatus and method when applied to that type of analytical instrument in which the output of the instrument may be presented as a spectrum consisting of variations in the magnitude of the response of the instrument against position along an ordinate corresponding to the value of some variable parameter related to a peculiar characteristic of the instrument input. Examples of this type of instrument are the mass spectrometer in which ion current is plotted against mass number (or more properly against mass:charge ratio), and the optical spectrometer in which the luminosity of various parts of the spectrum is plotted against wave length.

In an ideal analytical instrument the output is not capable of misinterpretation and presents a unique output component for each single input component. Thus, in the case of the mass spectrometer, the output should consist of a series of infinitely sharp spectral peaks, each such peak being centered on, and only on, a given mass number, with the amplitude of the peak indicating the magnitude of the particular component associated with any given mass number.

However, due to compromises made in the design of the instrument, constructional inaccuracies, and other factors, these ideal conditions are never met and the output response for each input component in fact becomes distributed over an appreciable range of values of the variable parameter, or in other words a response appears at values of the parameter where a response should properly only appear when other components are present in the instrument input, as well as the correct component. Up to a point this dispersion of the output of the analytical instrument can be tolerated since the results of the instrument can be interpreted notwithstanding its presence. However, when the overlap of adjacent peaks resulting from this dispersion becomes appreciable the instrument ceases to present information which can be directly interpreted by the operator and for this reason it is customary to use analytical instruments only under conditions in which the overlapping or dispersion of the output information is negligible.

To avoid this overlap much work has been done in the development of increasingly more elaborate and costly apparatus of high resolving power, that is to increase the range of usefulness of the instrument itself by making its output interpretable over a greater range.

It should be remembered however that even when the output of an analytical instrument is not directly interpretable, the basic information necessary for such interpretation may still be present, and it is on this premise that the present invention is founded. The fact that the information may be there but not directly interpretable has been appreciated by others and some attempts have been made to extract information from otherwise uninterpretable spectra, particularly those made up of superimposed peaks. One know method of extracting useful information is the graphical method and this is often useful in mass spectrometry where a very small mass peak may be superimposed on the "tail" of a much larger mass peak. Here the only interaction to be allowed for is the contribution of the large peak to the indicated height of the small peak, and a method of automatically stabilizing this contribution at a constant level while plotting the small peak has been previously proposed.

All of the known methods suffer from disadvantages in that they may be only applied to certain types of instruments and are frequently costly, tedious and time-consuming. The present invention, while having finite limitations as to the increase in resolving power which may be realized by its use, nevertheless can, for relatively moderate cost, bring about a substantial increase in the resolving power of an analytical instrument and, as shall be shown later, is capable of widespread application. Moreover the output of the system disclosed in the present invention is either presented in the same form as that of the instrument itself, or alternatively provides the necessary data for the information to be presented in this form.

The present invention is particularly useful with those analytical instruments in which the variable parameter of the spectrum is restricted to integral numbers which may be made to correspond to fixed positions along the spectrum. The invention is also especially convenient when the ordinal extent and formation characteristic of the instrument response for a single component input are the same throughout the whole range of interest of the variable parameter. Thus, as mentioned above, the present invention readily lends itself for use with a mass spectrometer, particularly when the deformation of the ideal output peak for a single input component is the same across the whole range of mass numbers under consideration.

In general terms, the technique of the present invention involves the operation of an electronic or other analog of an analytical instrument in conjunction with that instrument. Feedback paths are provided in such a way that the output spectrum of the analog device tends, by successive approximations, to become generally identical with the output spectrum of the real instrument. When these output spectra are so related, the internally generated signals appearing at the input of the analog device, as required to set up or to maintain such identity, will in general correspond to the input of the real instrument. These internally generated signals can then be used to identify the components present at the input of the real instrument, and to obtain the relative amplitudes of those components. This information can be displayed in the form of a spectrum in which the component peaks are resolved.

More specifically, the invention in its broad concept provides apparatus for improving the resolution of an output received from an analytical instrument in which a sharply defined input appears as a distributed output, comprising, (a) Analog means for generating from a discrete input signal (analog input) an analog output in the same distributed form as the instrument output, (b) Comparator means for comparing the magnitude of a section of the analog output with the magnitude of a corresponding section of the instrument output and for sensing a difference therebetween, and sections being narrow in relation to the distributed width of said outputs, (c) Input signal generator means connected to said comparator means and sensitive to a said difference for feeding an input signal to said analog means of a value to tend to bring said analog output towards equality of magnitude with said instrument output to nullify said difference (at least in magnitude—usually the signs are also equal, but they may be opposite), (d) Means for carrying out a series of successive sweeps of both said outputs by said comparator means, (e) And means connected to said input signal generator means for sensing the input signals to said analog means.

In operating the apparatus the sweeping means is caused to sweep repeatedly while modification of the analog output is continued, whereby, by a series of successive approximations, the two outputs (instrument and analog) tend to become equal to each other.

Two basic alternatives are now possible.

Once the outputs have become equal, they can be allowed to remain that way (assuming no change in the instrument output). This condition of exact equality will mean that the output from the comparator means will disappear, since the latter senses only a difference between the instrument and analog outputs. The input signal generator means, which is sensitive to any difference detected by the comparator means, will then receive no input. In this case, the apparatus must contain some form of storage or memory if the analog means is to continue to provide the existing analog output. In this way a static condition can be reached, with all three signals, instrument output, analog input and analog output remaining unchanged (for each respective position of the sweeping means). Such static condition will remain indefinitely, or until the instrument output changes, when the system will readjust itself by bringing the analog output into agreement again with the new instrument output. This may be thought of as the "separate storage" method of constructing the system, because a storage determining the analog output must be provided which can act without stimulation at the analog input.

The second alternative is not to allow the two outputs (instrument and analog) to maintain exact equality.

In a first sub-division of this second alternative, as the comparator means sweeps, it causes the input signal generator to feed a signal to the analog means that is reflected in the analog output in a way that achieves momentary equality between two narrow sections of the outputs which are at that time being compared by the comparator means. But, as soon as the comparator means moves on to sweep the next sections of the instrument and analog outputs, the analog output begins to decay by an amount proportional to the difference between the value of the section in question and a respective reference level. With this manner of operation, an appreciable divergence between the instrument and the analog outputs will have taken place by the time the sweeping means again returns the comparator means to the pair of sections previously under consideration, so that the difference detected by the comparator means will stimulate the input signal generator to feed a further input signal to the analog means to set up once again equality between the output sections under comparison. Thus, in this system, the analog output is not the result of a set of static stored values, but is generated freshly each sweep. This arrangement has a certain advantage over the so-called "separate storage" arrangement, because it permits the analog output to be stored in the same device as the analog input, as will become clearer from the specific examples that follow. This arrangement may therefore be conveniently referred to as the "single storage decaying memory" method of correction.

A second sub-division of the "single storage" method— namely a "single storage, non-decaying memory" method is also available. In this case the values of each section of the analog output are modified, but not by decay. They are each modified by an amount proportional to the difference between the value of the section in question and a respective reference level. The modification may be an increase or a decrease, and, since it will be applied by some external instrumentality (as distinct from a built-in decay), it may conveniently be applied to all sections of the analog output simultaneously during each interval between sweeps. The effect is similar to that of the decaying arrangement. Every time the comparator means sweeps, it finds a difference between a pair of corresponding sections of the two outputs, and it acts to rectify this difference through the input signal generator. By the time it comes around again, the equality achieved during the previous sweep has been lost by virtue of the "modification" of the analog output.

In all these alternatives the sensing means which senses the input signals to the analog means supplied by the input signal generator provides an indication of the instrument input, and the object of the invention has been achieved.

Specific examples of manners in which the invention may be carried into actual practice will now be described in conjunction with the accompanying drawings, these examples being included by way of illustration and not of limitation. In these drawings:

FIGURE 2a showing the actual output of the mass spectrometer, and FIGURE 2b showing the same output when processed by the present invention to place its information in interpretable form;

Figure 1:
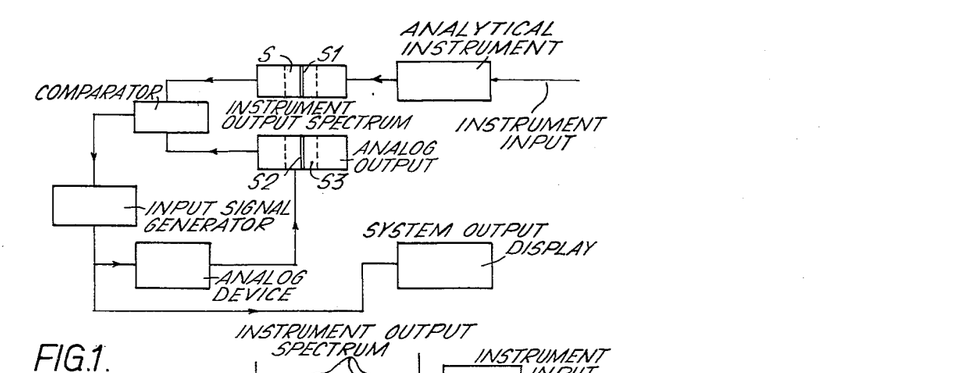
FIGURE 1 shows in simplified block diagram form the principal components utilized in the practice of the present invention.

The basic system of the present invention is shown in block diagram form in FIGURE 1. In this example there is assumed to be a single component input to the analytical instrument. The case of a multiple component input will be considered later with reference to FIGURE 1a. It will be seen that the output of the analytical instrument is shown in FIGURE 1 symbolically as a spectrum which, as mentioned above, may be generally considered as a plot of variations in the magnitude of the instrument response against position along an ordinate corresponding to the value of a variable parameter related to a particular characteristic of the instrument input, for example a plot of ion current against mass number in the case of a mass spectrometer. In this output spectrum a known single component input to the analytical instrument should properly be represented by a very narrow trace or peak S1 appearing only at that position along the spectrum of the particular value of the variable parameter which corresponds to the unique component. In practice however it will be found that the output response for a single component input spreads over a far wider range of values of the variable parameter occupying area S of the output spectrum and thus in effect gives a response at values of the variable parameter other than that corresponding to the known single component input. Thus for example if a substance of mass $m$ is analyzed in a mass spectrometer, it should give a sharp response in the form of a narrow peak opposite mass number $m$ on the output spectrum. It is possible to design mass spectrometers to achieve this, but it would be preferable to use simpler equipment giving a peak centered on mass number $m$ and dispersed over several adjacent mass numbers.

A fundamental part of the present invention is the provision of an analog device whose output consists of a spectrum S3 of the same form as that of the analytical instrument, and whose ordinal extent and formation characteristic are the same as those of section S of the instrument output spectrum. The analog device is so designed that the analog output spectrum S3 having the same ordinal extent and formation characteristic as that produced in section S of the instrument output spectrum for a single component input, is produced by presenting to the device an input whose ordinal extent and formation characteristic correspond generally to those which should appear in the output of the analytical instrument. Thus for the system shown in FIGURE 1 the analog output spectrum S3 is made to correspond as to ordinal extent and formation characteristic with S the actual section of the instrument output spectrum associated with a single component input, and the analog produces this output spectrum S3 when presented with an input corresponding generally as to extent and formation with section S1, the desired instrument output spectrum.

The system thus far described enables the analog device to have an output spectrum S3 corresponding to area S of the instrument spectrum so far as ordinal extent and formation characteristic are concerned, but there still remains the necessity of ensuring that the magnitude or intensity of the analog spectrum S3 corresponds to that of area S, and this is done by comparing the magnitude or intensity of a narrow central section of the area S, which may conveniently be the section S1, with a centrally located section S2 of the analog output spectrum, such section S2 being conveniently of the same ordinal extent as section S1. Then, by feedback techniques, the mean amplitude of section S2 is made equal to that of section S1. As will be shown later this comparison may either be done directly so as to make the magnitude or intensity of the analog output strip S2 equal to that of strip S1 of the instrument output spectrum, or alternatively the magnitude of strips S1 and S2 may be made equal and opposite in sign in relation to a reference level (for purposes explained below).

It will be seen that from the comparator in which the comparison of the two strip intensities is effected the resultant difference signal is applied to an input signal generator which in turn has its output applied as the input to the analog device.

Thus, as has been explained, the analog device has an output spectrum S3 of ordinal extent, formation characteristic, and magnitude corresponding to those of section S, which is that section of the instrument output spectrum associated with a single component input, and produces this output spectrum from an input of narrow extent generally equal to that of strip S1. Under these conditions the input to the analog device has an extent, formation and magnitude corresponding to those of strip S1, which is of course the output response the analytical instrument should give for a single component input, when in practice it gives an output response corresponding to section S. If the input to the analog device is now examined in a system output display then the output from the system will be observed as a response of ordinal extent, formation characteristic, and magnitude corresponding to those of strip S1 which means that the analog system has produced an output corresponding to the desired output from the analytical instrument as opposed to the actual output from the analytical instrument which has suffered from distortion.

Thus far, of course, the only comparison which has been effected has been when the analytical instrument is presented with a single component input of known position along the variable parameter, and in practice the instrument input will be a composite one rather than a single one, and the output spectrum will consist of many such individual output sections distributed along the variable parameter. Accordingly it is necessary to cause the comparator to scan repeatedly along the analog spectrum and along the instrument spectrum matching them at successive points, and this is done by electrical, mechanical or optical means, as the case may be.

Figures 1A, 2:
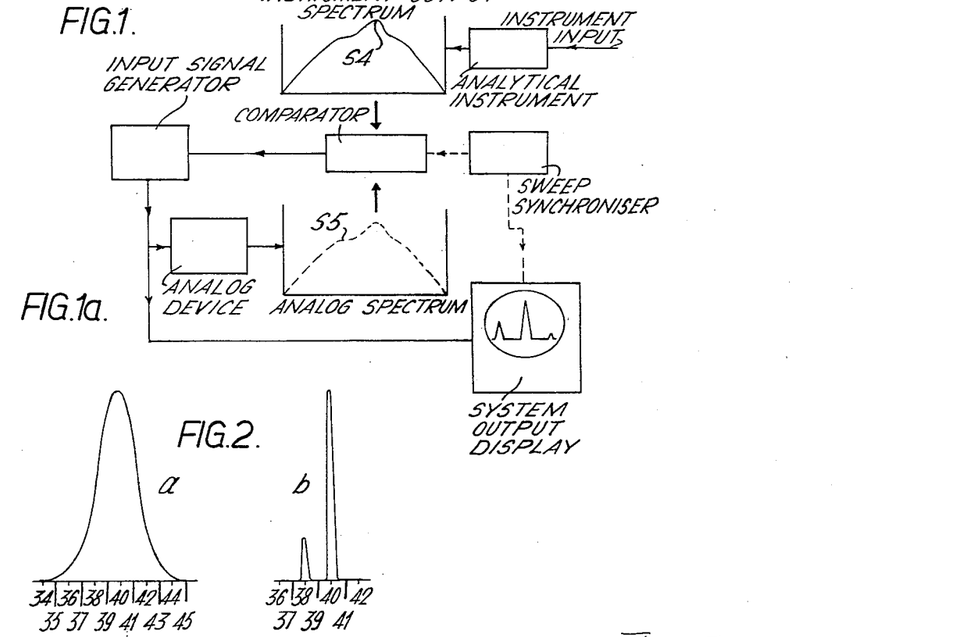
FIGURE 1a is a diagram similar to FIGURE 1 illustrating the application of the system to a complex instrument output.
FIGURE 2 demonstrates the manner in which the present invention is useful in interpreting otherwise unusable output information from a mass spectrometer.

FIGURE 1a illustrates the basic system similarly to FIGURE 1 but for composite (spectral) outputs from the analytical instrument, in place of the single output assumed in FIGURE 1. FIGURE 1a shows the same essential components, namely analytical instrument, comparator, input signal generator, analog device and system output display. In addition this system includes a sweep-synchronizer which controls scanning by the comparator of both spectra and synchronises such scanning with the sweep of the system output display. This figure shows a composite instrument output spectrum S4 which is made up of a number of superimposed spectra S. In the same way the analog spectrum S5 is made up of a number of superimposed analog outputs S3. The scanning of the analog spectrum is of course synchronized with the presentation on the system output display so that the system output is displayed once for each scan.

As was stated above, the analog output S3 (FIGURE 1) is made to have the same ordinal extent and formation characteristic as those of that section S of the instrument output spectrum corresponding to a single component input to the instrument. Provided the distortion introduced in the instrument is constant, i.e. the extent and formation of section S is the same throughout the whole of the instrument output spectrum, or at least throughout that range of the variable parameter which is of interest, then the extent and formation of section S3, i.e. the analog output, need not vary with the position of section S along the instrument output spectrum, and the present invention is most useful where this generalization holds true. However the system can be used even when the extent and formation of section S varies with its position along the instrument output spectrum and this may be done in the system of FIGURE 1a by feeding the output of the sweep synchronizer additionally to the analog device itself so that the extent and formation of the analog output can be made to vary in accordance with the position of the scan along the instrument output spectrum. To determine how the extent and formation of the analog output should vary with the position of the scan, it is best to apply single component inputs to the analytical instrument for different values of the variable parameter distributed throughout that range of the instrument output spectrum which is of interest. This enables the analog output to be calibrated, as it were, along the whole range of interest of the instrument output spectrum.

The results realizable with the foregoing system employing a double component input to the analytical instrument may be best appreciated from a study of FIGURE 2. FIGURE 2a shows the output spectrum obtained from a mass spectrometer when two isotopes of argon, namely argon 40 and argon 38 were applied to its input in the ratio of approximately 4.3 to 1. FIGURE 2b shows the system output display when the present invention was applied to this same mass spectrometer, and shows how effectively the resolving power of an instrument may be improved by the present invention.

Figure 3:
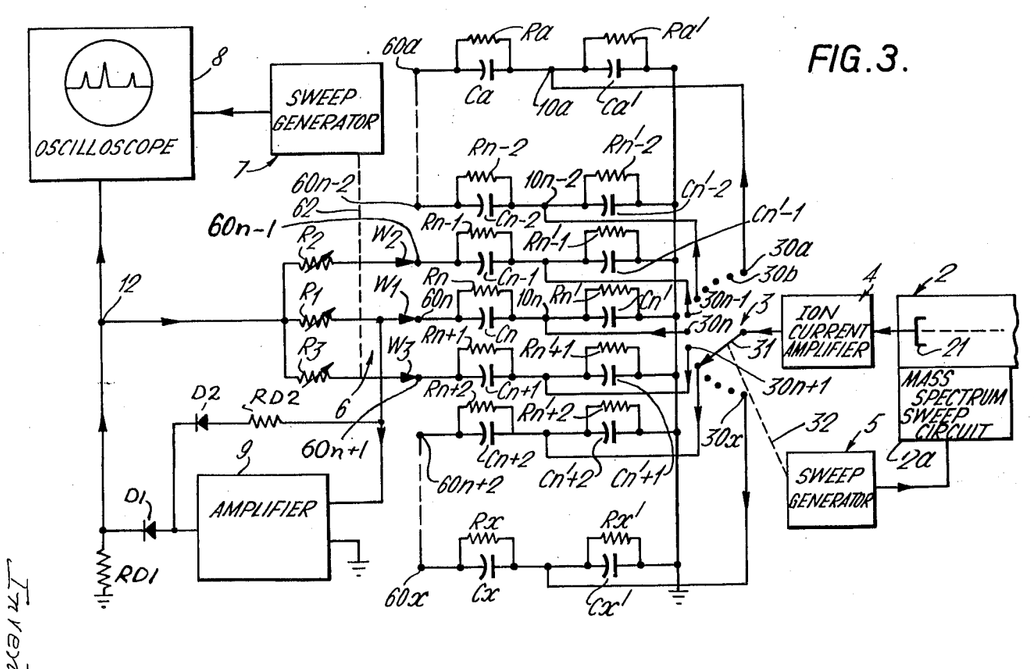
FIGURE 3 shows one form of the present invention for use with a mass spectrometer.

The system which produced the results shown in FIGURE 2b is shown in FIGURE 3, and a detailed description of this system will give a better understanding of the present invention. This system is of the "single storage, decaying memory" type described above. The analytical instrument whose resolving power is to be improved is a mass spectrometer 2 having a collector 21 which, as the output of the mass spectrometer is swept across the collector by the sweep circuit 2a controlled by the sweep generator 5, is struck in succession by those ions having a progressively higher common mass per unit charge. The sweep generator 5 also controls via link 32 the position of the rotary arm 31 of a rotary switch 3. This rotary switch has a large number of contacts 30a, 30b ... 30n ... 30x, which the wiper arm 31 thus sweeps in synchronism with the sweep generator 5. The speed of rotation of switch 3 is normally made appreciably faster than that of the analog output scanning system, which will be described later, but can approximate this speed if the decay time is made long.

The output of the collector 21 is applied via ion current amplifier 4 to rotary wiper arm 31 so that, due to the synchronism of the system, the wiper arm repeatedly donates to each switch contact a current proportional to the amount of ion current reaching collector 21 while the arm is on that contact. Thus, for example, contact 30n will always receive a current corresponding to the number of ions impinging on collector 21 when the mass spectrometer is sweeping through mass number $n$. If the spectrometer had an ideal output response, current would be donated to one switch contact only, when a gas of unique mass number was analysed in the mass spectrometer, but in practice it may be found that currents are donated to at least one, and generally to two or more, of the switch contacts on each side of the switch contact corresponding to the particular mass number of the component input being analyzed.

The current from each switch contact is fed separately to one of an associated series of resistors and capacitors connected in parallel to a common reference potential, which may be suitably ground potential. Thus current donated to contact 30a is fed by terminal 10a to capacitor $Ca'$ connected in parallel with resistor $Ra'$, the other side of the parallel RC circuit being connected to ground. Sufficient switch contacts and associated parallel resistor-capacitor combinations are provided to cover all of the integral mass numbers falling within the range of interest, and this is illustrated symbolically by the fact that the switch contacts go as high as 30x connected to ground in series with capacitor $Cx'$ and resistor $Rx'$ in parallel.

For the general case, switch contact 30n associated with mass number $n$ is connected via terminal 10n to capacitor $Cn'$, which is parallel connected with resistor $Rn'$, the other sides of these components being connected to ground. Contacts 30n−1 and 30n+1, associated with mass numbers $n-1$ and $n+1$ respectively, on each side of contact 30n are connected in similar fashion to capacitors $Cn'-1$, $Cn'+1$, via leads 10n−1 and 10n+1. Thus each time rotary wiper arm 31 sweeps across the switch contacts 30a ... 30n ... 30x, associated capacitors $Ca'$ ... $Cn'$ ... $Cx'$ receive a charge corresponding to the number of ions reaching the collector 21 while the arm 31 is on the respective switch contacts, and thus the capacitor series $Ca'$ ... $Cn'$ ... $Cx'$ may be considered as storing on their terminals, the output spectrum of the mass spectrometer 2. The resistor associated with each capaictor provides a discharge path of long time constant so that a small portion of the charge in each capacitor leaks away between successive wipes of the rotary arm 31, thus enabling the capacitors to continuously represent in close approximation the correct output spectrum for the mass spectrometer.

In the event that it is desired to analyse existing records, the inputs to the remainder of the circuit, which the charges on capacitors $Ca'$ ... $Cn'$ ... $Cx'$ represent, can be provided by a series of potential dividers manually set to give potentials corresponding to the ordinates of the recorded spectra (that is prerecorded instrument output) at successive mass numbers.

Each switch contact 30a ... 30n ... 30x is also connected to one side of another parallel RC circuit consisting of capacitors $Ca$ ... $Cn$ ... $Cx$ in parallel with resistors $Ra$ ... $Rn$ ... $Rx$, the other side of each of these RC combinations being connected respectively to contacts 60a ... 60n ... 60x of a rotary switch 6.

This rotary switch 6 may have three wiper arms W1, W2 and W3 which may be considered connected at any instant to switch contacts 60n, 60n−1 and 60n+1 respectively, i.e., the wiper arms are arranged to be one contact out of phase with each other. Wiper arms W1, W2 and W3 are connected via variable resistors R1, R2, R3 respectively to a common junction 12, and wiper arm W1 is also connected via an amplifier 9, to this junction 12. Amplifier 9 is a direct current amplifier of large gain having reversed polarity between input and output. As will be explained later, it is advantageous to include between amplifier 9 and junction 12 a diode D1, with a resistor RD1 between junction 12 and ground, though the presence of the diode D1 is not essential if only a low increase in resolving power is to be attempted. In addition, it is also convenient to provide a diode D2 with series resistor RD2 between the output of amplifier 9 and wiper arm W1. The direction of the diodes D1, D2 has been shown as suitable for the example which follows, in which it is assumed that negative potentials are applied to terminals 10a ... 10x. If positive potentials were applied at these terminals, the direction of both diodes would be reversed.

As was mentioned earlier, the mass spectrometer when analysing a single component input does not give a unique output ion current at the appropriate mass number but rather gives a distributed output response centered on the particular mass number but having, in addition to the ion current at the proper mass number, ion currents present at at least those mass numbers immediately adjacent the particular mass number and frequently for two or more mass numbers on each side of the given mass number. The operation of the system may be best understood by imagining that, for the moment, a single component input of mass number $n$ is being analyzed by the spectrometer and that this input is giving a distributed output response centered on rotary contact 30n of rotary switch 3 such that capacitor $Cn'$ has formed thereon a charge proportional to the ion current appearing at the collector when the spectrometer is sweeping through mass number $n$ as is proper, but also capacitor $Cn'-1$, $Cn'+1$ have received charges even though there are no input components to the mass spectrometer having mass numbers $n-1$, or $n+1$. It is, of course, this charge dispersion which the present system seeks to eliminate or at least substantially reduce.

Before the rotary switch 6 begins to sweep, the stored charge on capacitors $Cn'-1$, $Cn'$ and $Cn+1$ will set up corresponding potentials with respect to ground on contacts 60n−1, 60n and 60n+1. When the wiper arms W1 to W3 begin to sweep around the rotary switch 6, these potentials will be detected by arm W1, amplified and changed in sign by amplifier 9 and returned via junction 12 to arms W1, W2 and W3 to charge up capacitors $Cn-1$, $Cn$ and $Cn+1$ to potentials tending to balance the potentials on capacitors $Cn'-1$, $Cn'$ and $Cn'+1$. It requires a number of sweeps to set up an equilibrium condition, a fact best illustrated by numerical examples. The first example to be given will assume a single component input, as above indicated.

Suppose the ordinates of the single peak representing mass $n$ are in ratio 0:1:2:0 at mass numbers $n-2$, $n-1$, $n$, $n+2$ respectively. The pattern of currents fed by the wiper arms W2, W1 and W3 is made to be in the ratio 1:2:1 by adjustment of the relative values of resistors R2, R1, R3. Suppose that when switch 6 begins its first sweep there are potentials 0, $-100$, $-200$, $-100$, 0 arbitrary units on terminals $10n-2$, $10-1$, $10n$, $10n+1$, $10n+2$. For simplicity it is assumed that the wiper arms move across the contacts $60n-2$ . . . $60n+2$ in a time which is short compared with the time between successive sweeps. The potentials on $60n-2$ . . . $60n+2$ will be the same until the center wiper arm W1 reaches contact $60n-1$, the first contact with a potential on it. This condition is illustrated in tabular form as follows:

| Arm W1 on— | Potential on— | | | | | Current Units passed by arm W1 |
|---|---|---|---|---|---|---|
| | $60n-2$ | $60n-1$ | $60n$ | $60n+1$ | $60n+2$ | |
| $60n-2$ | 0 | $-100$ | $-200$ | $-100$ | 0 | 0 |
| $60n-1$ | $+50$ | 0 | $-150$ | $-100$ | 0 | 100 |

What has happened is that on detecting the $-100$ potential on contact $60n-1$, the amplifier 9 has delivered a positive output (analog input) which passes through resistor R1 and restores the potential on arm W1 and contact $60n-1$ to ground potential, a charge being stored in capacitor $Cn-1$ equal and opposite to that in capacitor $Cn'-1$. The resistors R2 and R3 are each set to have twice the value of resistor R1, and therefore charges of $+50$ units will be simultaneously transmitted to contacts $60n-2$ and $60n$ modifying their voltages as above indicated.

Now, when the rotary switch 6 steps forward one contact, the detecting arm W1 reads the $-150$ potential on contact $60n$, restores this and adds $+75$ units to the two contacts on each side. This action and that of the succeeding steps can be shown in tabular form as follows:

| Arm W1 on— | Potential on— | | | | | Current Units passed by arm W1 |
|---|---|---|---|---|---|---|
| | $60n-2$ | $60n-1$ | $60n$ | $60n+1$ | $60n+2$ | |
| $60n-1$ | $+50$ | 0 | $-150$ | $-100$ | 0 | 100 |
| $60n$ | $+50$ | $+75$ | 0 | $-25$ | 0 | 150 |
| $60n+1$ | $+50$ | $+75$ | $+12.5$ | 0 | $+12.5$ | 25 |
| $60n+2$ | $+50$ | $+75$ | $+12.5$ | 0 | 0 | $-12.5$ |

Note that, in the last step, the arm W1, when on contact $60n+2$, receives a positive potential. This generates a negative output from amplifier 9 which is blocked by diode D1, but passed by diode D2 to the arm W1, but only to arm W1. No output appears at junction 12, so no output appears on the oscilloscope 8, and the adjacent arms W2 and W3 pass no current.

The potentials of the last row above are thus those remaining between the contacts concerned and ground when the wiper arm W1 passes beyond the area of interest.

Before the next sweep of the rotary switch 6, these potentials will be modified by decay through resistors $Rn-2$ . . . $Rn+2$. They will each decay by an amount proportional to the potential difference between each contact 60 and its corresponding terminal 10 (the latter still being charged at the original pattern, since it is assumed that there has been no change to input conditions). Assuming the proportion of decay, which proportion will be the same for each section under consideration (e.g. each contact), to be 1%, the potentials remaining after the decay time will be $60n-2:50-1\%$ of $50=49.5$
$60n-1:75-1\%$ of $175=73.25$
$60n:12.5-1\%$ of $212.5=10.375$
$60n+1:0-1\%$ of $100=-1$
$60n+2:0-1\%$ of $0=0$ If now these are the potentials presented to the wiper arms when they made the second sweep, the result will be as follows:

| Arm W1 on— | Potential on— | | | | | Current Unit passed by arm W1 |
|---|---|---|---|---|---|---|
| | $60n-2$ | $60n-1$ | $60n$ | $60n+1$ | $60n+2$ | |
| Second Sweep: | | | | | | |
| $60n-3$ | $+49.5$ | $+73.25$ | $+10.375$ | $-1$ | 0 | 0 |
| $60n-2$ | 0 | $+73.25$ | $+10.375$ | $-1$ | 0 | $-49.5$ |
| $60n-1$ | 0 | 0 | $+10.375$ | $-1$ | 0 | $-73.25$ |
| $60n$ | 0 | 0 | 0 | $-1$ | 0 | $-10.375$ |
| $60n+1$ | 0 | 0 | $+0.5$ | 0 | $+0.5$ | 1 |
| $60n+2$ | 0 | 0 | $+0.5$ | 0 | 0 | $-0.5$ |

Note again that the majority of outputs from amplifier 9 were negative and consequently of no effect on the adjacent wiper arms.

Two sweeps have now taken place, and a potential remains only on contact $60n$. With the same 1% potential change between sweeps the results of the third, fourth, fifth and sixth sweeps will be approximately as follows:

| Arm W1 on— | Potential on— | | | | | Current Units passed by arm W1 |
|---|---|---|---|---|---|---|
| | $60n-2$ | $60n-1$ | $60n$ | $60n+1$ | $60n+2$ | |
| Third Sweep: | | | | | | |
| $60n-3$ | 0 | $-1.00$ | $-1.50$ | $-1.00$ | 0 | 0 |
| $60n-2$ | 0 | $-1.00$ | $-1.50$ | $-1.00$ | 0 | 0 |
| $60n-1$ | $+0.50$ | 0 | $-1.00$ | $-1.00$ | 0 | 1.00 |
| $60n$ | $+0.50$ | $+0.50$ | 0 | $-0.50$ | 0 | 1.00 |
| $60n+1$ | $+0.50$ | $+0.50$ | $+0.25$ | 0 | $+0.25$ | 0.50 |
| $60n+2$ | $+0.50$ | $+0.50$ | $+0.25$ | 0 | 0 | $-0.25$ |
| Fourth Sweep: | | | | | | |
| $60n-3$ | $+0.50$ | $-0.50$ | $-1.75$ | $-1.00$ | 0 | 0 |
| $60n-2$ | 0 | $-0.50$ | $-1.75$ | $-1.00$ | 0 | $-0.50$ |
| $60n-1$ | $+0.25$ | 0 | $-1.50$ | $-1.00$ | 0 | 0.50 |
| $60n$ | $+0.25$ | $+0.75$ | 0 | $-0.25$ | 0 | 1.50 |
| $60n+1$ | $+0.25$ | $+0.75$ | $+0.12$ | 0 | $+0.12$ | 0.25 |
| $60n+2$ | $+0.25$ | $+0.75$ | $+0.12$ | 0 | 0 | $-0.12$ |
| Fifth Sweep: | | | | | | |
| $60n-3$ | $+0.25$ | $-0.25$ | $-1.88$ | $-1.00$ | 0 | 0 |
| $60n-2$ | 0 | $-0.25$ | $-1.88$ | $-1.00$ | 0 | $-0.25$ |
| $60n-1$ | $+0.12$ | 0 | $-1.76$ | $-1.00$ | 0 | 0.25 |
| $60n$ | $+0.12$ | $+0.88$ | 0 | $-0.12$ | 0 | 1.76 |
| $60n+1$ | $+0.12$ | $+0.88$ | $+0.06$ | 0 | $+0.06$ | 0.12 |
| $60n+2$ | $+0.12$ | $+0.88$ | $+0.06$ | 0 | 0 | $-0.06$ |
| Sixth Sweep: | | | | | | |
| $60n-3$ | $+0.12$ | $-0.12$ | $-1.94$ | $-1.00$ | 0 | 0 |
| $60n-2$ | 0 | $-0.12$ | $-1.96$ | $-1.00$ | 0 | $-0.12$ |
| $60n-1$ | $+0.06$ | 0 | $-1.88$ | $-1.00$ | 0 | 0.12 |
| $60n$ | $+0.06$ | $+0.94$ | 0 | $-0.06$ | 0 | 1.88 |
| $60n+1$ | $+0.06$ | $+0.94$ | $+0.03$ | 0 | $+0.03$ | 0.06 |
| $60n+2$ | $+0.06$ | $+0.94$ | $+0.03$ | 0 | 0 | $-0.03$ |

Potentials are only accurate to $\pm 0.01$ unit from the third sweep on. The potential fall between sweeps (compare the last line of the fifth sweep with the first line of the sixth sweep) has now become approximately 0, 1, 2, 1, 0 units respectively. It will be observed that this fall (modification of the sections of the analog output) is in the case of each section proportional to the difference between the amplitude of such section of the analog output and a reference level.

At each successive sweep, the current passed by the center wiper arm W1 is approaching zero for all positions except when this arm is on contact $60n$. In this position the current passed by the arm is tending towards $+2$ units. This figure represents the amount of charge lost by capacitor $Cn$ between each sweep. It represents a potential of $-2 \times 100$ units on terminal $10n$. The oscilloscope display 8 would therefore be approaching an indication of a single peak of mass $n$ and of amplitude $2 \times 100 = 200$ arbitrary units. Such a display corresponds to that which could be obtained from the output of a mass spectrometer capable of completely resolving the adjacent masses. It may also be noted that the potentials on $60n-2$ . . . $60n+2$ tend towards 0, 0, $-2$, $-1$, 0 at the start of a sweep, changing to 0, $+1$, 0, 0, 0 after the center wiper arm has passed $60n$. During the interval between sweeps these potentials decrease by 0, 1, 2, 1, 0 units respectively, to again give 0, 0, −2, −1, 0 at the start of the next sweep.

Figures 7A, 7B, 7C:
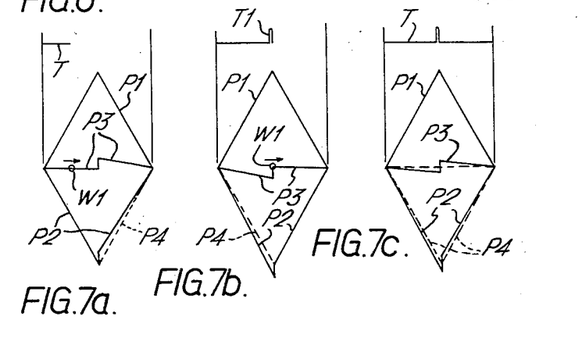
FIGURES 7a to 7c are diagrams illustrating the manner of operation of the system of FIGURE 3.

These potential changes which result from the method of successive approximations may conveniently be illustrated graphically in the manner of FIGURES 7a, b and c, which show the variations with time, after the system has reached a stable condition, of the potentials on terminals 60 for a single component input of simple triangular distributed form, curve P1.

Curve P1 represents the potentials on terminals $10n-2$ to $10n+2$ (instrument output spectrum); curve P2 represents the potential differences across capacitors $Cn-2$ to $Cn+2$ (analog output spectrum); curve P3 represents the potentials between $60n-2$ to $60n+2$ and ground, and is the algebraic sum of curves P1 and P2; broken line P4, part of which is coincident with part of curve P2, represents the mirror image of curve P1.

The curves in FIGURES 7a to c are idealised in that they will only truly appear in this continuous form for a large number of wiper arms. As indicated, arm W1 is assumed to be in an early part of the sweep across contacts $60n-2$ to $60n+2$ in FIGURE 7a. Trace T demonstrates the trace on oscilloscope 8 (system output display). At this position the instrument and analog outputs are equal, so arm W1 detects nothing and there is no deflection of trace T.

FIGURE 7b shows the conditions immediately after arm W1 has reached the center contact $60n$. Contact $60n$ has been brought to ground potential, the charges passing to contacts $60n-1$ and $60n+1$ bringing the curves P2 and P3 to the new shapes shown. The current units passed by arm W1 (analog input) appear as a peak T1 on the trace T. The potential on contact $60n+1$ has now been brought to ground, and so the sweep continues without any further passage of current through the wiper arms or any further deflection of trace T.

FIGURE 7c shows the corresponding distribution of potentials after elapse of half the decay time interval, that is the interval between successive sweeps. It will be observed that due to the stored potentials on capacitors $Cn-2$ to $Cn+2$, both curves P2 and P3 are returning from their FIGURE 7b conditions towards their FIGURE 7a conditions, which latter are the beginning of the next sweep.

Consider now the situation when the instrument input is complex.

Suppose that the ordinates of a single peak are again in the ratio 0:1:2:1:0 for successive mass numbers. The current pattern fed by the wiper arms will again be in the same ratio. Suppose that a complex peak is to be analysed and that this is made up of two components, one peak of mass $n$ and one of mass $n+1$, with amplitudes in the ratio 2:1. Suppose that the larger peak has ordinates of 0, 100, 200, 100, 0 at mass numbers $n-2$ ... $n+2$ respectively, and that the smaller peak has ordinates 0, 50, 100, 50, 0 at mass numbers $n-1$ ... $n+3$ respectively. The complex peak would then have ordinates of 0, 100, 250, 200, 50, 0 at mass numbers $n-2$ ... $n+3$ respectively. Suppose the system is switched on with corresponding negative potentials on terminals $10n-2$ ... $10n+3$. It is assumed that the wiper arms move across contacts $60n-2$ ... $60n+3$ in a time which is short compared with the time between successive sweeps. It is again assumed that the interval between successive sweeps is sufficient for 1 percent of the charges on the capacitors C′ to leak away. The potentials on contacts $60n-2$ ... $60n+3$ will be the same as those on terminals $10n-2$ ... $10n+3$ until the center wiper arm reaches contact $60n-1$. Thereafter, the potentials on $60n-2$ ... $60n+3$ and the charges passing through the center wiper will be as follows:

| Arm W1 on— | Potentials on— | | | | | | Current units passed by arm W1 |
|---|---|---|---|---|---|---|---|
| | 60n−2 | 60n−1 | 60n | 60n+1 | 60n+2 | 60n+3 | |
| First Sweep: | | | | | | | |
| 60n−2 | 0 | −100 | −250 | −200 | −50 | 0 | 0 |
| 60n−1 | +50 | 0 | −200 | −200 | −50 | 0 | 100 |
| 60n | +50 | +100 | 0 | −100 | −50 | 0 | 200 |
| 60n+1 | +50 | +100 | +50 | 0 | 0 | 0 | 100 |
| 60n+2 | +50 | +100 | +50 | +50 | 0 | 0 | 0 |
| 60n+3 | +50 | +100 | +50 | 0 | 0 | 0 | 0 |
| Second Sweep: | | | | | | | |
| 60n−3 | +49.5 | +98 | +47 | −2 | −0.5 | 0 | 0 |
| 60n−2 | 0 | +98 | +47 | −2 | −0.5 | 0 | −49.5 |
| 60n−1 | 0 | 0 | +47 | −2 | −0.5 | 0 | −98 |
| 60n | 0 | 0 | 0 | −2 | −0.5 | 0 | −47 |
| 60n+1 | 0 | 0 | +1 | 0 | +0.5 | 0 | 2 |
| 60n+2 | 0 | 0 | +1 | 0 | 0 | 0 | −0.5 |
| 60n+3 | 0 | 0 | +1 | 0 | 0 | 0 | 0 |
| Third Sweep: | | | | | | | |
| 60n−3 | 0 | −1 | −1.51 | −2 | −5.0 | 0 | 0 |
| 60n−2 | 0 | −1 | −1.51 | −2 | −0.5 | 0 | 0 |
| 60n−1 | +0.50 | 0 | −1.01 | −2 | −0.5 | 0 | 1 |
| 60n | +0.50 | +0.50 | 0 | −1.50 | −1.0 | 0 | 1.01 |
| 60n+1 | +0.50 | +0.50 | +0.75 | 0 | +0.25 | 0 | 1.50 |
| 60n+2 | +0.50 | +0.50 | +0.75 | 0 | 0 | 0 | −0.25 |
| 60n+3 | +0.50 | +0.50 | +0.75 | 0 | 0 | 0 | 0 |

Potentials are only accurate to ±0.01 unit from the third sweep on. The potential fall between sweeps has now become approximately 0, 1, 2.5, 2, 0.5, 0 units respectively.

| Arm W1 on— | Potentials on— | | | | | | Current units passed by arm W1 |
|---|---|---|---|---|---|---|---|
| | 60n−2 | 60n−1 | 60n | 60n+1 | 60n+2 | 60n+3 | |
| Fourth Sweep: | | | | | | | |
| 60n−3 | +0.50 | −0.50 | −1.75 | −2.00 | −0.50 | 0 | |
| 60n−2 | 0 | −0.50 | −1.75 | −2.00 | −0.50 | 0 | −0.50 |
| 60n−1 | +0.25 | 0 | −1.50 | −2.00 | −0.50 | 0 | 0.50 |
| 60n | +0.25 | +0.75 | 0 | −1.25 | −0.50 | 0 | 1.50 |
| 60n+1 | +0.25 | +0.75 | +0.62 | 0 | +0.12 | 0 | 1.25 |
| 60n+2 | +0.25 | +0.75 | +0.62 | 0 | 0 | 0 | −0.12 |
| 60n+3 | +0.25 | +0.75 | +0.62 | 0 | 0 | 0 | 0 |

| Arm W1 on— | Potentials on— | | | | | | Current units passed by arm W1 |
|---|---|---|---|---|---|---|---|
| | 60n−2 | 60n−1 | 60n | 60n+1 | 60n+2 | 60n+3 | |
| Fifth Sweep: | | | | | | | |
| 60n−3 | +0.25 | −0.25 | −1.88 | −2.00 | −0.50 | 0 | 0 |
| 60n−2 | 0 | −0.25 | −1.88 | −2.00 | −0.50 | 0 | −0.25 |
| 60n−1 | +0.12 | 0 | −1.76 | −2.00 | −0.50 | 0 | 0.25 |
| 60n | +0.12 | +0.88 | 0 | −1.12 | −0.50 | 0 | 1.76 |
| 60n+1 | +0.12 | +0.88 | +0.56 | 0 | +0.06 | 0 | 1.12 |
| 60n+2 | +0.12 | +0.88 | +0.56 | 0 | 0 | 0 | −0.06 |
| 60n+3 | +0.12 | +0.88 | +0.56 | 0 | 0 | 0 | 0 |
| Sixth Sweep: | | | | | | | |
| 60n−3 | +0.12 | −0.12 | −1.94 | −2.00 | −0.50 | 0 | 0 |
| 60n−2 | 0 | −0.12 | −1.94 | −2.00 | −0.50 | 0 | −0.12 |
| 60n−1 | +0.06 | 0 | −1.88 | −2.00 | −0.50 | 0 | 0.12 |
| 60n | +0.06 | +0.94 | 0 | −1.06 | −0.50 | 0 | 1.88 |
| 60n+1 | +0.06 | +0.94 | +0.53 | 0 | +0.03 | 0 | 1.06 |
| 60n+2 | +0.06 | +0.94 | +0.53 | 0 | 0 | 0 | −0.03 |
| 60n+3 | +0.06 | +0.94 | +0.53 | 0 | 0 | 0 | 0 |
| Seventh Sweep | | | | | | | |
| 60n−3 | +0.06 | −0.06 | −1.97 | −2.00 | −0.50 | 0 | 0 |
| 60n−2 | 0 | −0.06 | −1.97 | −2.00 | −0.50 | 0 | −0.06 |
| 60n−1 | +0.03 | 0 | −1.97 | −2.00 | −0.50 | 0 | 0.06 |
| 60n | +0.03 | +0.97 | 0 | −1.03 | −0.50 | 0 | 1.94 |
| 60n+1 | +0.03 | +0.97 | +0.51 | 0 | +0.01 | 0 | 1.03 |
| 60n+2 | +0.03 | +0.97 | +0.51 | 0 | 0 | 0 | −0.01 |
| 60n+3 | +0.03 | +0.97 | +0.51 | 0 | 0 | 0 | 0 |

At each successive sweep, the current passed by the center wiper arm W1, the analog input, is approaching zero for all positions except when this arm is on contacts $n$ or $n+1$. In these positions the current is converging towards +2 and +1 units respectively. As before, these signals represent resolved mass peaks of masses $n$ and $n+1$ and having amplitudes of 200 and 100 arbitrary units respectively. This analog input spectrum appears at the oscilloscope 8 which constitutes the system output display and shows the mass spectrum which could have been obtained using a mass spectrometer capable of completely resolving the adjacent peaks. Sweeping of the oscilloscope 8 is synchronised with that of rotary switch 6 by sweep generator 7, as indicated symbolically at 62. When the system is started from rest the oscilloscope display normally reaches a steady state after five to ten sweeps of the wiper arms so that, in one system where the revolution rate was one cycle per second, the display reached a steady state after five to ten seconds.

It can be shown that the specific system of FIGURE 3 is properly represented by the general layouts of FIGURES 1 and 1a. The instrument output spectrum may be considered as the charges in the series of capacitors $Ca' \ldots Cn' \ldots Cx'$, each associated with a different mass number, and extending across the entire range of interest, which capacitors charge up in direct proportion to the ion currents present at the output of the mass spectrometer when the respective mass numbers are selected. These capacitors reflect the distortion in the output of the spectrometer in that a single input component charges up not only that capacitor properly associated with its mass number, but in addition charges the surrounding capacitors associated with adjacent mass numbers. Thus, in effect, section S of FIGURE 1 is represented by the number of capacitors which receive ion currents when a single component input is presented to the mass spectrometer, and strip S1 is represented by that capacitor associated with the mass number corresponding to the single component. The analog output is represented by the charges on capacitors $Ca \ldots Cn \ldots Cx$ built up by the wiper arms which have their current pattern so arranged, by adjustment of their associated resistances R1 to R3, as to tend to build up charges on capacitors $Ca \ldots Cn \ldots Cx$ to neutralize the charges on the instrument output spectrum capacitors.

Continuing the consideration of the relationship between FIGURES 1 and 1a, on the one hand, and FIGURE 3 on the other, the amplifier 9 and diodes D1 and D2 can be considered as providing the input signal generator, while the amplifier 9 also functions along with the center wiper arm W1 as the comparator. The analog device may be considered as represented by the three resistances R1 to R3, the rotary switch 6 including contacts $60a \ldots 60n \ldots 60x$, and the analog storage capacitors $Ca \ldots Cn \ldots Cx$. Resistors $Ra \ldots Rn \ldots Rx$ function as means for modifying all sections of the analog output (as stored on capacitors $Ca \ldots Cn \ldots Cx$), by providing for decay of the capacitor potentials. The current units passed by wiper arm W1 represent the analog input spectrum.

In the present case three wiper arms have been shown but in practice five, seven, or more wiper arms could be used to get even closer approximations to the desired result. There only remains the comparison of the magnitude of the two output sections and this is done indirectly, in the manner referred to earlier in connection with FIGURE 1, by comparing the instantaneous voltage on wiper arm W1 (which may thus be considered the same as the narrow strip S2 of FIGURE 1) with a reference voltage, in this case ground potential, so that there flows through wiper arm W1, a charge sufficient (and of correct sign) to change capacitors $Ca \ldots Cn \ldots Cx$ to potentials equal and opposite to the potentials on respective capacitors $Ca' \ldots Cn' \ldots Cx'$.

The degree of improvement in resolving power depends on the number of wiper arms used. With a simple system such as that shown in FIGURE 3 the resolving power of a mass spectrometer could be made approximately four times as great, i.e. this system has a multiplication factor of 4. In a more complex system with seven wiper arms and 26 contacts on switch 6, a resolving power multiplication factor of 8 has been obtained.

To accommodate the situation which arises when the analog output must vary as to ordinal extent and formation characteristic throughout its scanning cycle, it is of course necessary to vary the values of resistors R1, R2, R3 . . . etc. (depending on the number of wiper arms used) as the analog output goes through its scanning cycle, with some of these resistors possibly becoming infinite, i.e. open circuit, when the ordinal extent is to be reduced. In practice this result can be achieved quite readily by constructing switch 6 as a commercial stepping switch of the type known as a "Strowger" switch in the telephone art, in which the wiper arms do not successively scan one set of switch contacts but rather each wiper arm has its own set of associated switch contacts, i.e. there are as many sets of switch contacts as there are wiper arms. Thus each wiper arm has its own switch contact for each mass number and a resistor of the appropriate value for the wiper arm and switch contact under consideration can be inserted in the contact connection. Of course many more resistors are used, and thus the simpler system is normally used wherever possible, but nevertheless variations in the analog output response both as to lateral extent and formation characteristics can be accommodated if desired.

In the system of FIGURE 3, the amplitudes of the various sections of the analog output, as stored on capacitors $Ca \ldots Cn \ldots Cx$, are modified between sweeps of switch 62 by decay of the potentials on such capacitors through resistors $Ra \ldots Rn \ldots Rx$. The time constants are such as to permit only a small percentage decay in the period between sweeps, and all the decays take place in the same proportion (for example 1%) of the initial potential. Since these decays are proportional to the potentials on capacitors $Ca \ldots Cn \ldots Cx$, and the potentials on these capacitors have been built up to balance the potentials on capacitors $Ca' \ldots Cn' \ldots Cx'$, the decays are proportional to the potentials on the latter capacitors, which potentials represent the instrument output.

Figure 3A:
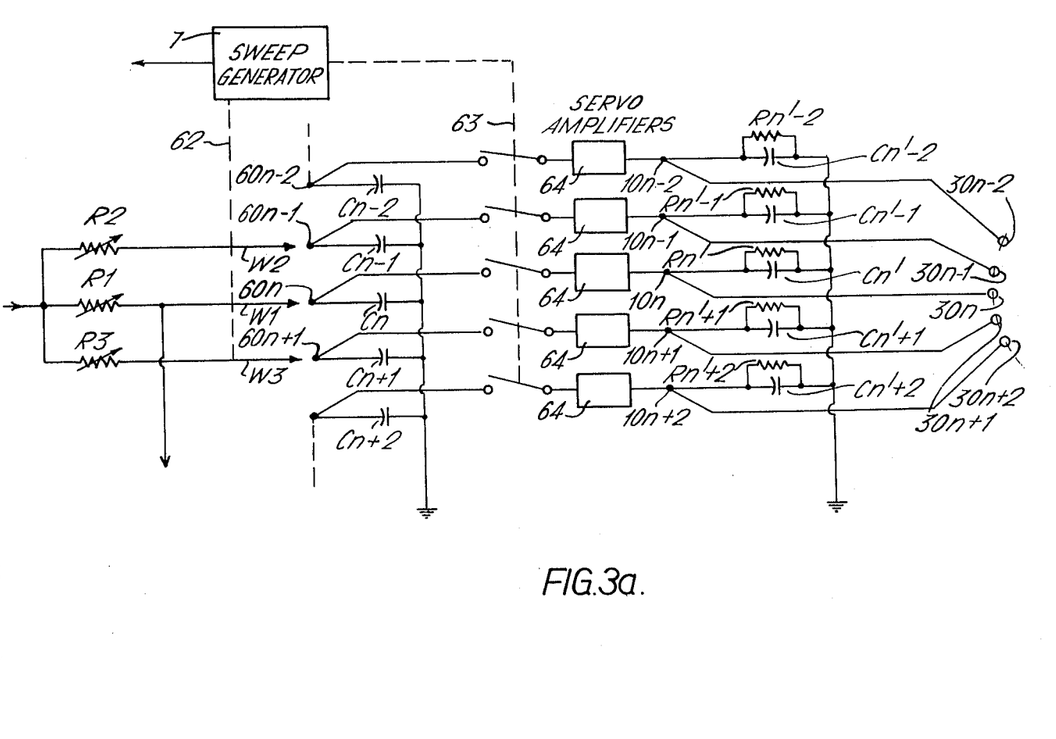
FIGURE 3a shows a portion of a modified form of the circuit of FIGURE 3.

It is this latter proportionality that is the truly fundamental one, a consideration which will facilitate appreciation of the modified circuit illustrated in FIGURE 3a which is of the "single storage, non-decaying memory" type, above referred to. FIGURE 3a shows only a part of FIGURE 3, the parts not shown being the same as in FIGURE 3. The modification consists of eliminating resistors $Ra \ldots Rn \ldots Rx$ (thus eliminating the decay paths); disconnecting from terminals $10a \ldots 10n \ldots 10x$ the terminals of capacitors $Ca \ldots Cn \ldots Cx$ on the sides remote from terminals $60a \ldots 60n \ldots 60x$ and connecting such capacitor terminals to ground; and providing a multipole switch 63, each pole of which is arranged when the switch is closed to connect terminals $60a \ldots 60n \ldots 60x$ to respective terminals $10a \ldots 10n \ldots 10x$ each through a servo amplifier 64. The purpose of these connections is to modify the potentials on capacitors $Ca \ldots Cn \ldots Cx$ (analog output) by amounts proportional to the potentials on capacitors $Ca' \ldots Cn' \ldots Cx'$ (instrument output). Servo amplifiers are best suited to this function, as it is necessary that the increments of potential added to or subtracted from the analog output sections should be truly proportional to the potentials of the corresponding instrument output sections regardless of the existing potentials on the analog output sections and with a minimum of disturbance to the instrument output itself. Control of switch 63 is exercised by the sweep generator to ensure that switch 63 closes in each interval between sweeps of switch 62.

Applying this circuit to the simple numerical example given above, where potentials of $0, -100, -200, -100, 0$ units were assumed to form the instrument output on terminals $10n-2, 10n-1, 10n, 10n+1$ and $10n+2$, the potentials on the corresponding terminals $60n-2, 60n-1, 60n, 60n+1$ and $60n+2$ will fall by $0, -1, -2, -1, 0$ units when switch 63 closes between sweeps, assuming 1% of the potentials are transferred. Operation of this modified system is thus very similar to that of FIGURE 3, except that the potential drops between sweeps will be constant from the first sweep, instead of only approaching $0, -1, -2, -1, 0$ units after several sweeps by successive approximations.

Consideration will now be given to the "separate storage" aspect of the present invention. In this case, essentially the same basic circuit as that of FIGURE 1a is employed, except that the input signal generator employs a separate memory on which is built up a store of the analog input as this is generated, this stored analog input spectrum being modified in successive sweeps until the analog output spectrum becomes identical with the instrument output spectrum. Until the instrument output spectrum varies, the system remains static, since there is no inter-sweep modification of the analog output spectrum. The stored analog input spectrum can then be read out at will into the system output display.

A numerical example will again be taken to facilitate understanding of the system, and, as before, a simple, idealised triangular peak shape of the instrument output represented at successive intervals along the spectral range by the relative values 0, 1, 2, 1, 0 will be assumed, for an instrument input which, in the absence of peak spreading would give a narrow peak S1 of amplitude 2 units. Suppose there are two peaks with amplitudes of 200 and 100 units respectively and spaced one step apart along the abscissa of the spectrum. With each peak spread, they will overlap to give a resultant spectrum IOS (instrument output spectrum) as follows:

| | | | | | |
|---|---|---|---|---|---|
| First peak | 0 | 100 | 200 | 100 | 0 | 0 |
| Second peak | 0 | 0 | 50 | 100 | 50 | 0 |
| IOS | 0 | 100 | 250 | 200 | 50 | 0 |

Initially the analog input spectrum (AIS) and the analog output spectrum (AOS) will be zero. Now the comparator measures the difference IOS−AOS which initially stands at the same as the IOS, namely $$0 \quad 100 \quad 250 \quad 200 \quad 50 \quad 0$$

In step 1 of sweep 1, the comparator detects the first (left hand) of these values, namely 0, and there is no effect.

In step 2 of sweep 1, the comparator detects the second of these values, namely 100, and stimulates the input generator to feed a corresponding signal of +100 units as this section of the AIS, which now overall appears as belows:

$$0 \quad +100 \quad 0 \quad 0 \quad 0 \quad 0$$

The analog device spreads this signal in imitation of the characteristics of the analytical instrument, so that the AOS has added to it the values:

$$+50 \quad +100 \quad +50 \quad 0 \quad 0 \quad 0$$

Thus the AOS in total becomes:

$$+50 \quad +100 \quad +50 \quad 0 \quad 0 \quad 0$$

since it was entirely zero before this step. The values of IOS−AOS are now:

$$-50 \quad 0 \quad +200 \quad +200 \quad +50 \quad 0$$

since the IOS is assumed constant throughout.

In step 3 of sweep 1, the comparator now detects the third of these values, namely +200. As a result the AIS becomes:

$$0 \quad +100 \quad +200 \quad 0 \quad 0 \quad 0$$

and the AOS has added to it:

$$0 \quad +100 \quad +200 \quad +100 \quad 0 \quad 0$$

to become:

$$+50 \quad +200 \quad +250 \quad +100 \quad 0 \quad 0$$

Now IOS−AOS has become:

$$-50 \quad -100 \quad 0 \quad +100 \quad +50 \quad 0$$

In step 4 of sweep 1, the comparator detects the fourth of these values, namely +100. As a result the AIS becomes:

$$0 \quad +100 \quad +200 \quad +100 \quad 0 \quad 0$$

and the AOS has added to it:

$$0 \quad 0 \quad +50 \quad +100 \quad +50 \quad 0$$

to become:

$$+50 \quad +200 \quad +300 \quad +200 \quad +50 \quad 0$$

In consequence IOS−AOS becomes:

$$-50 \quad -100 \quad -50 \quad 0 \quad 0 \quad 0$$

In steps 5 and 6 of sweep 1 no further changes take place because in each case the comparator reads a zero value for IOS−AOS. These values thus persist until the second sweep, since there is no inter-sweep modification of potentials.

In step 1 of sweep 2, the comparator detects the first of these values, namely −50. Now the memory of the input signal generator is made to reject negative signals, so the AIS remains

0   +100   +200   +100   0   0 and no changes result.

In step 2 of sweep 2, the comparator detects the second value of IOS−AOS, namely −100. Now 100 units can be subtracted from the memory, since the latter carried the value +100 at this position. Thus AIS becomes:

0   0   +200   +100   0   0 and the AOS has added to it:

−50   −100   −50   0   0   0 making AOS:

0   +100   +250   +200   +50   0

It will now be seen that IOS−AOS has become:

0   0   0   0   0   0 and the sought identity between the instrument and the analog outputs has been achieved. From henceforth the system remains static until the IOS varies, since the comparator continues to detect zero on each step of each sweep.

It will be noted that simultaneously with achievement of this equality between the outputs, the AIS has become:

0   0   +200   +100   0   0 which will be seen to represent the two instrument output peaks, fully resolved and of correct amplitude.

Figure 3B:
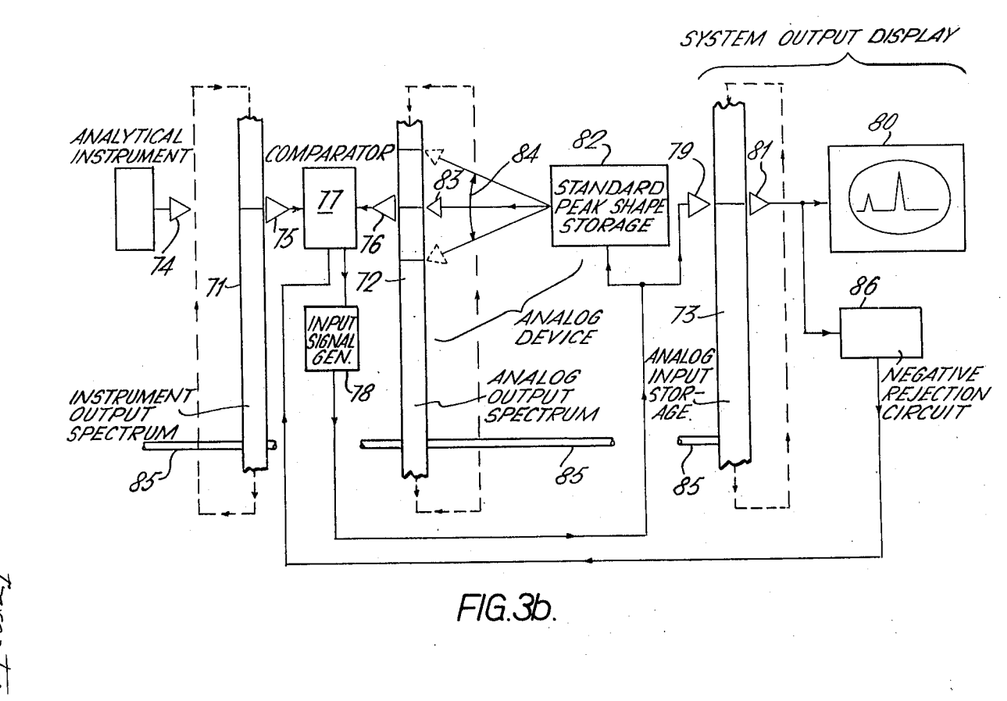
FIGURE 3b shows another manner of carrying the invention into practice.

Apparatus functioning in this manner is illustrated in FIGURE 3b, and comprises three synchronously driven loops of electrostatic storage tapes 71, 72 and 73, tape 71 acting to store the instrument output spectrum applied to it by read-on head 74, and tape 72 acting to store the analog output spectrum and as part of the analog device. Read-out heads 75 and 76 feed corresponding sections of these two spectra to the comparator 77, in accordance with the general case illustrated in FIGURE 1a. The input signal generator 78 to which the comparator 77 is connected will be an amplifier, if gain is needed, although in this form of the invention it may comprise simply a wire for transferring the output of the comparator to the next elements of the system.

Maintaining the adherence of the circuit to the general structure of the invention illustrated in FIGURE 1a, the input signal generator 78 feeds to two places: the system output display and the analog device.

The system output display consists, in this case, of tape 73 which receives every output from the input signal generator through read-in head 79, and, during successive sweeps (that is successive rotations of tape 73), integrates these signals to provide a record of the aggregate of the output of the input signal generator, which is equivalent to saying the aggregate of the analog input. This stored information (analog input storage) is displayed on oscilloscope 80 by means of read-out head 81.

The analog input from the input signal generator is applied to a standard peak shape storage 82 and the signal so received is used to modulate the intensity of a signal fed by storage 82 to an oscillating read-on head 83. This head 83 builds up the analog output spectrum on the tape 72 until it becomes equal in value and distributed form to the instrument output spectrum (this being the static condition finally reached in the immediately preceding numerical example), when the output from the comparator 77 and the input signal generator 78 has become zero in all positions around the tapes. The analog input storage on tape 73 will have achieved a static condition by this time, such condition being truly representative of a resolved instrument output and which will be displaced in oscilloscope 80. To achieve the distributed form of analog output spectrum necesary to correspond to the unresolved instrument output spectrum, the read-on head 83 is oscillated back and forth along the tape 72 as indicated by arrows 84. This oscillation will have a period several orders of magnitude shorter than the period of tape rotation determined by drive shaft 85. The range of oscillation of head 83 will correspond to the distributed width of an isolated spectral peak, and as head 83 oscillates, the effective resistance in series with the head will be varied in the storage 82 (e.g. by a potentiometer driven by a suitable shaped cam) so that the average charge pattern transferred to tape 72 corresponds to the distributed shape of a spectrum peak, the magnitude of such peak being determined by the amplitude of the signal received from input signal generator 78. If a cam is used to vary the resistance, its shape represents the stored standard peak shape (if head 83 moves at a constant speed).

Conveniently the read-on heads may take the form of small rollers touching the surfaces of the tapes and connected to high impedance outputs to allow read-on without loss of the signals already stored on the tapes. The read-out heads may similarly consist of small rollers connected to high impedance inputs.

A negative rejection circuit 86 also receives the signal from read-out head 81. Whenever the head 81 detects a slightly negative potential appearing on tape 73, indicating a tendency for an analog input peak of negative amplitude to be recorded, the negative rejection circuit 86 will temporarily hold the output of the comparator 77 to zero. This circuit 86 avoids any tendency to instability and reduces the time taken for the system to come to equilibrium.

In the systems so far described the output spectrum of the mass spectrometer was in effect displayed either in the form of variations in the state of discrete elements such as the charges on a series of capacitors, with each capacitor corresponding to a sequentially higher mass number, or in the form of a spectrum of charges along electrostatic storage tapes. The instrument output could quite conveniently have been displayed in other forms. One method of doing this is to display the output in the form of luminous intensity variation along an elongated trace corresponding to variations in mass number. This can be done by moving an intensity-modulated spot linearly over a photo-persistent surface (or similarly by synchronously moving the intensity-modulated electron beam of an oscilloscope). In this condition the output of the mass spectrometer is in the same form as that of the optical spectrometer shown in FIGURE 4.

Figures 4, 4A:
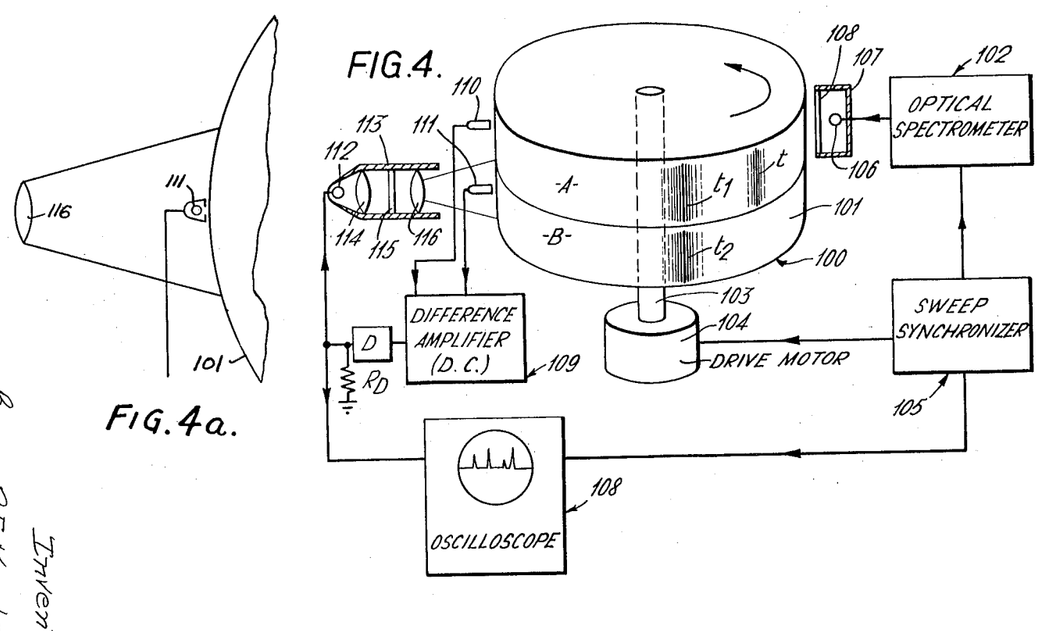
FIGURE 4 shows a form of the present invention for use with an optical spectrometer.
FIGURE 4a is a plan view of a fragment of FIGURE 4 on a larger scale.

Here the optical spectrometer 102 feeds its output to a light source 106 in a housing 107 in whose front face is formed a slit 108 so that variations in the light output of the bulb 106 fall on the photo-persistent surface 101 of the upper section A of revolving drum 100. Drum 100 is rotated by means of shaft 103 connected to drive motor 104. Sweep synchronizer 105 controls the rotation both of drive motor 104 and the presentation of the output of optical spectrometer 102 so that the output of the spectrometer is repetitively and synchronously displayed in the form of a spectrum on upper surface A. This spectrum consists of variations in the intensity of the trace against position around the drum, which position corresponds to wavelength (or in the case of the mass spectrometer to mass number).

Ideally the output of the spectrometer should have the form of trace $t$, i.e. the variation in intensity should have only a very limited ordinal extent, but in practice the output will have the form of trace $t_1$, i.e. will be distributed over an appreciable ordinal extent and will have a definite formation characteristic as to intensity variations over this extent. Thus in effect trace $t$ is the ideal output and corresponds to strip S1 of FIGURE 1, and trace $t_1$ is the practical output for a unique component input and corresponds to strip S of FIGURE 1.

In the system shown in FIGURE 4 the analog device has the form of an optical projector comprising an elongated light-tight housing 113 in which are positioned lenses 114 and 116, and between them a transparency 115. Illumination is provided by light source 112. Transparency 115 is so designed that the analog output as projected on lower surface B of revolving drum 100 has the same lateral extent and formation characteristic as does trace $t_1$, and this is shown as trace $t_2$ on lower surface B. Transparency 115 may either be obtained by appropriately marking a transparent piece of material, or alternatively it can be a photographic positive transparency produced from trace $t_1$.

With this arrangement the output trace $t_2$ of the analog device is the same as to ordinal extent and formation characteristic as that of trace $t_1$ of the instrument output section associated with a single component input (i.e. a component of single wavelength), and thus traces $t_1$ and $t_2$ may be considered as representing sections S and S3 respectively of FIGURE 1.

It will be noted that here the scanning is done by moving the instrument output with respect to the analog output, whereas for the system shown in FIGURE 3 the analog output was moved with respect to the instrument output. Of course either method will serve, the primary requirement being that there be relative movement between the two outputs.

To complete the system it therefore only remains to make the intensity of trace $t_2$ equal that of trace $t_1$ by comparing the intensities of narrow center sections of each trace, and this is done by comparing the output of photoelectric cells 110 and 111 which view narrow vertical strips of surfaces A and B respectively. As the fragmentary plan view of FIGURE 4a better shows on a larger scale, the photocell 111 (and similarly photocell 110) must be shielded from direct light from source 112 so as to detect only the illumination of the drum surface. The difference between the outputs of the two cells 110 and 111 is amplified in direct current amplifier 109 and fed back as a signal of appropriate polarity and magnitude to light source 112 so that trace $t_2$ is darkened or lightened as required until it is of the same intensity, ordinal extent, and formation characteristic as trace $t_1$. Diode D is of analogous function to diode D1 of FIGURE 3 and is only needed if the system involves brightening of the trace above a standard level. If only brightening from zero level is involved then no diode is needed, as there cannot be negative illumination.

Decay of the photo-persistent brightness of the drum surface provides the necessary modification to the analog output (as stored) analogously with that provided in the FIGURE 3 example by the leakage resistors Ra etc. For a given inter-scan decay time which must be short in relation to the time required for the surface to lose all its brightness, the decay characteristics must be such that the percentage decay is constant, and independent of the initial brightness. The FIGURE 4 system is thus essentially a "decaying memory" type of system.

If the input to the optical projector (analog device) is now viewed on an oscilloscope 108, or any other convenient form of system output display, the sweep of the oscilloscope being synchronized by sweep synchronizer 105, then the output display will consist of a series of peaks of varying amplitude, one such peak being displayed whenever there is a component of single wavelength present in the input to the spectometer.

Instead of a drum, the operation can be carried out on oscilloscope screen, if preferred.

To accommodate the situation in which the ordinal extent and formation characteristic of trace $t_1$ vary with its position along the instrument output spectrum, it is of course necessary to vary trace $t_2$ in sympathy by changing transparency 115, and this may be done as before by making a large number of such transparencies and interposing them in succession in the light projected onto lower surface B in synchronism with the drum rotation by means of any convenient link from sweep synchronizer 105.

Figure 5:
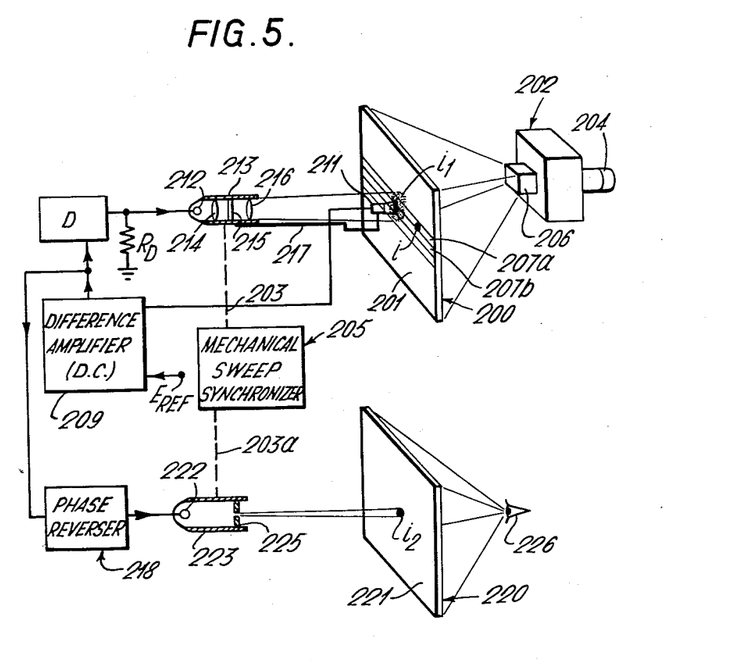
FIGURE 5 shows the present invention when applied to an analytical instrument whose output is a plot of luminosity against position in two dimensions.

In addition to comparing intensity directly in the manner shown, the comparison can be effected indirectly in a manner described more fully in connection with another "decaying memory" type of system shown in FIGURE 5 by applying the instrument output in negative form and a positive analog output to the same photo-persistent surface making the analog output brighter whenever the instrument output darkens thereby seeking to maintain the photo-persistent surface at a uniform standard level of illumination. This is thus a true "single storage, decaying memory" system.

In the systems described thus far the instrument output spectrum has essentially been one dimensional, that is there has only been one variable parameter the other variation being in magnitude rather than position. However the system may be used with equal facility for analytical instruments whose output is two-dimensional, as is shown in FIGURE 5.

Here the instrument 202, which may be an optical projector or some other optical amplification device, has a lens system or some similar output structure represented symbolically by box 206 from which the projector output is continuously displayed on a translucent screen 200 when a slide representing a negative image of the two dimensional display to be analysed is examined in input chamber 204. On this screen a single component input, which in the present case may be defined as a point source, should appear as a small point image $i$, but due to distortion of the instrument in fact appears as a blurred image $i_1$, whose form may be other than circular, and whose intensity decreases, often in a non-uniform manner, from the center outward. In fact, the light amplitude is increasing, since the decrease referred to is of a negative image. Accordingly the present invention must generate a point image of appearance corresponding to image $i$, whenever there appears in the instrument output an image corresponding in appearance to image $i_1$.

This is done by applying to the opposite surface of screen 200 a transparent or translucent phosphor coating 201, whose decay time is large compared with the time for one scanning cycle of the analog system to be described. The arrangement or characteristics both of the phosphor and the light from projector 202 are such that the phosphor is not activated by the light from projector 202. The analog device is similar to that described in connection with FIGURE 4 and consists of a light-tight housing 213 having positioned therein a positive transparency 215 projected and focussed by lenses 214 and 216, and illuminated by a light source 212 so that the analog device projects on phosphor coating 201, which is sensitive thereto, an image whose ordinal extent (in this case its area) and formation characteristic correspond to those of image $i_1$, the image actually provided by the analytical instrument when presented with a point source input. Thus as before the analog output is made the same as to extent and formation characteristic with that of that section of the instrument output associated with a single component input, in this case a point source image.

There thus remains the need for making the magnitude or intensity of the analog output equal and opposite to that of the instrument output, and this is done by means of photocell 211 which may be conveniently supported from the analog device housing 213 by means of an arm 217. This photocell 211 is arranged to close to the screen 200 and is shielded from light from source 212 including reflection from the screen. It detects only light arising from the photo-persistence of the small area of screen directly beneath it and light transmitted through the screen from the corresponding section of the image projected by projector 202 at the point under investigation. The photocell 211 inspects a small center portion of image $i_1$, corresponding generally in area to that of image $i$, the ideal instrument output, and this output is fed to a difference amplifier 209 where it is compared with a reference voltage $E_{REF}$ and the difference fed via diode D (with a resistor RD between this diode and ground) to the light source 212. Thus, the comparison is effected indirectly by arranging the output of the analog device to be equal but opposite in intensity to the projected negative image corresponding to the positive output of the analytical instrument.

This means that the analog device output is brightened whenever the projected negative image of the instrument output is darkened, and the result is to seek to bring the phosphor coating 201 to a uniform level of intensity corresponding to the value of voltage $E_{REF}$. It will be necessary to make $E_{REF}$ correspond to the background brightness of the projected negative image.

With the system described thus far the output of the analog device will be identical as to ordinal extent and formation characteristic with that section of the instrument output associated with a point source input, and the intensity of the analog output will be equal but opposite to that of the projected negative image of the instrument output section relative to a given reference level. Thus the desired conditions have been met, and the input to the analog device may be viewed as before to give the system output. In the present case it is desirable to have the system output display in the same form as that of the instrument and this is done by providing a translucent or transparent screen 220 similar in size and shape to screen 200 which has applied to one surface a phosphor coating 221 similar to phosphor coating 201 applied to screen 200. A point image projection system comprising casing 223 provided at one end with a cover 225 in which is a pinhole, and at the other end with a light source 222, will project on to screen 220 a point image $i_2$, corresponding generally to the ideal instrument point source image $i$, whenever a distorted image $i_1$ appears at the instrument output. To control the intensity, light source 222 is connected to the input to the analog device, but, since, the system is arranged so that the analog input is a brightening pulse whenever the negative projected image of the instrument output is darkened, it may be desired to include in the connection to light source 222 a phase reverser 218 so that the system output display is darkened whenever the analog input is brightened. The position of image $i_2$ is of course arranged to have the same position with respect to screen 220 as has image $i_1$ with respect to screen 200, so that observer 226 will see in the correct position on screen 220 a point image $i_2$ whenever a distorted image $i_1$ appears on screen 200.

There thus remains only the means for scanning the instrument output with the analog output, and this is done by a mechanical sweep synchronizer 205 which may have any convenient form, such as, for example, that used in the early type of television scanning system. By this scanning system the analog output is first moved along a narrow lateral trace 207a of screen 200, and is then displaced downwardly and moved along a second narrow lateral trace 207b, immediately below trace 207a, the process being continued until the whole of the screen 200 has been scanned when it is repeated starting at the top of the screen. The vertical extent of each trace 207 is made to correspond to that of ideal point source image $i$, and hence of image $i_2$ in the system output display, so that the entire system output is painted for one scanning cycle. This scanning system is of course analogous to the raster-producing mechanism of a television display.

As mentioned the analog output is such as to return screen 200 to a standard level of brightness corresponding to voltage $E_{REF}$ applied the difference amplifier 209.

When the projected negative image is allowed to fall on the screen, output variations are produced in photocell 211, which in turn vary the intensity of light source 212 so as to compensate for the departure from the standard brightness level, so that after a number of paints the screen again reaches this standard brightness level. When this is done the negative projected image corresponding to the instrument output is almost exactly balanced by the analog image, and by displaying the analog input on a second screen a reproduction will be formed which corresponds to the true variations of intensity with position of the object being viewed by the optical instrument.

As before, for reasons of stability, the analog device must be prevented from generating an output when a signal corresponding to negative brightness is fed in, since under these conditions the system may not always converge to a solution, and accordingly diode D and resistor RD are included to prevent, or minimize the possibility of, such a condition occurring.

As for the system shown and described in connection with FIGURE 5, positive transparency 215 in the analog device must be changed in synchronism with the position being scanned at any instant if the ordinal extent or area and formation characteristic of the analog output must be altered depending on its position on the instrument output image. These transparencies could, as before, be derived by taking photographs of the associated section of the instrument output image as a point source is applied in a large number of different positions to the instrument input. These transparencies could then be stored and scanned in sequence.

Figure 6:
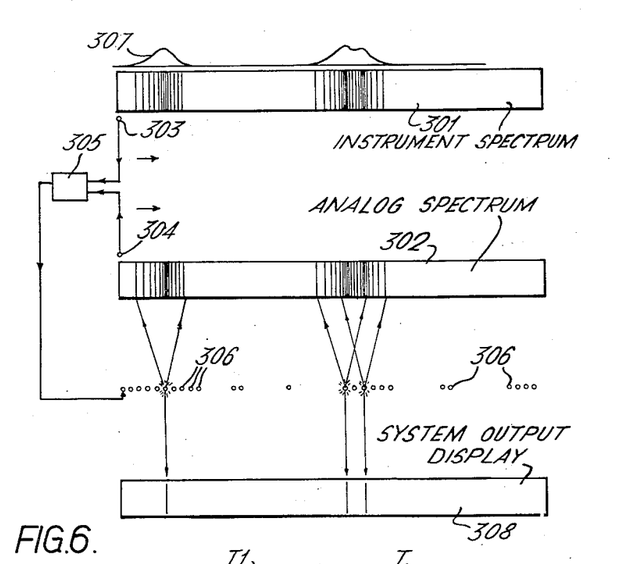
FIGURE 6 shows yet another embodiment of the invention.

FIGURE 6 shows a further embodiment of the invention for improving the resolution of spectra that form part of existing records obtained at some time in the past from an analytical instrument (in this case a spectrometer), rather than constitute the contemporaneous output of an instrument operating in conjunction with the apparatus of the invention. This figure shows the instrument spectrum as 301 and the analog spectrum as 302. Light sensing elements 303 and 304 scan the two spectra simultaneously viewing corresponding narrow sections as they sweep. Amplifier 305 compares and senses any difference in illumination level, and varies the illumination of the analog spectrum by varying the brilliance of successive ones of a row of light sources 306. These sources 306 are all continuously energised (including energisation at zero level) and the effect of sweeping along such sources with the output of the amplifier 305 is to modify such energisations, in synchronism with sweeping of the spectra. Each source 306 shines on the analog spectrum 302 with a beam having the same intensity distribution as a single input peak 307 of the instrument spectrum. At the same time each source 306 shines in a sharply defined beam on the system output display 308.

I claim:
1. Apparatus for improving the resolution of an output received from an analytical instrument in which a sharply defined input appears as a distributed instrument output, comprising
    (a) analog means for generating from a discrete input signal an analog output in the same distributed form as the instrument output,
    (b) comparator means for comparing the magnitude of a section of the analog output with the magnitude of a corresponding section of the instrument output for sensing a difference therebetween, said sections being narrow in relation to the distributed width of said inputs,
    (c) input signal generator means connected to said comparator means and sensitive to a said difference for feeding an input signal to said analog means of a value to tend to bring said analog output towards equality of magnitude with said instrument output to nullify said difference at least in magnitude, (d) sweep means connected to both said outputs and to said comparator means for causing said comparator means to carry out a series of successive sweeps of both said outputs, (e) and means connected to said input signal generator means for sensing the input signals to said analog means.

2. Apparatus according to claim 1, including means for modifying all sections of said analog output between each successive sweep by an amount proportional to the difference between each section and a respective reference level.

3. Apparatus according to claim 2, wherein the reference level for each section is the value of the instrument output for that section.

4. Apparatus according to claim 2, wherein said means for modifying comprises means for continuously decaying each section of the analog output between successive sensings of such section on successive sweeps of said comparator means.

5. Apparatus according to claim 2, wherein said modifying means comprises means for simultaneously modifying all sections of the analog output between successive sweeps of said comparator means.

6. Apparatus according to claim 1, wherein said means connected to said input signal generator means for sensing the input signals to the analog means comprises analog input storage means for receiving the signal fed from said input signal generator means to the analog means and for forming an integrated store of said signals.

7. Apparatus for improving the resolution of an output received from an analytical instrument in which a sharply defined input appears as a distributed instrument output, comprising (a) means for storing said distributed instrument output, (b) analog means for generating from a discrete input signal an analog output in the same distributed form as the instrument output, (c) means for storing said analog output, (d) comparator means for comparing the magnitude of a section of the analog output with the magnitude of a corresponding section of the instrument output for sensing a difference therebetween, said sections being narrow in relation to the distributed width of said outputs, (e) input signal generator means connected to said comparator means and sensitive to a said difference for feeding an input signal to said analog means of a value to tend to bring the section of said analog output under comparison towards equality of magnitude with the corresponding section of the instrument output to nullify said difference at least in magnitude in respect of the sections momentarily under comparison while simultaneously modifying adjacent sections of the analog output in conformance with said distributed form.

(f) sweep means connected to both said storing means and to said comparator means for causing said comparator means to carry out a series of successive sweeps of both said stored outputs to compare the sections of said outputs with each other in corresponding pairs, successively and repeatedly, (g) and means connected to said input signal generator means for sensing the input signals to said analog means as a measure of the instrument input.

8. Apparatus according to claim 7, including means for modifying all sections of said analog output between each successive sweep by an amount proportional to the difference between each section and a respective reference level.

9. Apparatus according to claim 8, wherein the reference level for each section is the value of the instrument output for that section.

10. Apparatus according to claim 8, wherein said modifying means comprises means for continuously decaying each section of the analog output between successive sensings of such sections on successive sweeps of said comparator means.

11. Apparatus according to claim 8, wherein said modifying means comprises means for simultaneously modifying all sections of the analog output between successive sweeps of said comparator means.

12. Apparatus according to claim 7, wherein said means connected to said input signal generator means for sensing the input signals to said analog means comprising analog input storage means for receiving the signal fed to the analog means and for forming an integrated store of such signals.

13. Apparatus according to claim 7, wherein said instrument and analog outputs are stored as a series of individual components.

14. Apparatus according to claim 7, wherein said instrument and analog outputs are each stored as a continuous spectrum.

No references cited.